(12) United States Patent
Cojocaru et al.

(10) Patent No.: US 10,062,224 B2
(45) Date of Patent: Aug. 28, 2018

(54) DUAL ACCESS LEVEL SECURITY SYSTEM AND METHOD

(71) Applicant: Tyco Safety Products Canada Ltd., Concord (CA)

(72) Inventors: Aurel Cojocaru, Mississauga (CA); Glenn Nishida, Unionville (CA); Philip Yan Wong Yu, Toronto (CA)

(73) Assignee: Tyco Safety Products Canada Ltd., Concord (CA)

( * ) Notice: Subject to any disclaimer, the term of this patent is extended or adjusted under 35 U.S.C. 154(b) by 0 days.

(21) Appl. No.: 14/717,141

(22) Filed: May 20, 2015

(65) Prior Publication Data

US 2015/0339870 A1 Nov. 26, 2015

Related U.S. Application Data

(60) Provisional application No. 62/000,603, filed on May 20, 2014.

(51) Int. Cl.
*G07C 9/00* (2006.01)
*G08B 25/00* (2006.01)
(Continued)

(52) U.S. Cl.
CPC ..... *G07C 9/00039* (2013.01); *G07C 9/00031* (2013.01); *G07C 9/00079* (2013.01); *G07C 9/00111* (2013.01); *G07C 9/00563* (2013.01); *G07C 9/00571* (2013.01); *G08B 25/008* (2013.01); *G08B 25/14* (2013.01); *G07C 9/0069* (2013.01); *G07C 9/00182* (2013.01);
(Continued)

(58) Field of Classification Search
None
See application file for complete search history.

(56) References Cited

U.S. PATENT DOCUMENTS 7,248,151 B2 * 7/2007 McCall ............... B60R 25/2045
340/425.5
2002/0029342 A1 * 3/2002 Keech .................... G06Q 20/02
713/184

(Continued)

OTHER PUBLICATIONS

"Virtual Keyboard." Brookstone. Merrimack, NH. 30 pages.
"VK200 KEYFOB: User Guide." CTX Virtual Technologies Inc. 2013. 49 pages.

*Primary Examiner* — Leon-Viet Nguyen
(74) *Attorney, Agent, or Firm* — HoustonHogle LLP

(57) ABSTRACT

A dual or progressive access level security system and method is disclosed. The system receives or acquires one or more initial access identifiers of the user via an identity reader. In examples, the identity reader is a biometric scanner such as a fingerprint scanner that reads a fingerprint, or an antenna such as a Near Field Communication (NFC) antenna that reads an initial access identifier from a tag within a user device such as a fob or mobile phone or a Bluetooth identifier from the user's mobile computing device. In response to validation of the initial access identifier, the system presents virtual keys for the user to enter an access code. In embodiments, the virtual keys are included within a touchscreen and within a virtual projected keyboard presented by the security system. The security system grants access to the user in response to validation of the access code.

19 Claims, 5 Drawing Sheets

(51) Int. Cl.
 *G08B 25/14* (2006.01)
 *H04L 9/08* (2006.01)
(52) U.S. Cl.
 CPC ..... *G07C 2209/04* (2013.01); *G07C 2209/63* (2013.01); *H04L 9/0877* (2013.01)

(56) References Cited

U.S. PATENT DOCUMENTS

| | | | |
|---|---|---|---|
| 2012/0092130 A1* | 4/2012 | Chung | G06Q 10/08 340/10.1 |
| 2014/0104034 A1* | 4/2014 | Ambrefe, Jr. | G07C 9/00087 340/4.4 |
| 2015/0123912 A1* | 5/2015 | Nikolic | B64D 43/00 345/173 |
| 2016/0055699 A1* | 2/2016 | Vincenti | G07C 9/00309 340/5.61 |
| 2016/0216515 A1* | 7/2016 | Bouchier | G03H 1/0808 |

* cited by examiner

DUAL ACCESS LEVEL SECURITY SYSTEM AND METHOD

RELATED APPLICATIONS

This application claims the benefit under 35 USC 119(e) of U.S. Provisional Application No. 62/000,603, filed on May 20, 2014, which is incorporated herein by reference in its entirety.

BACKGROUND OF THE INVENTION

Security systems are often installed within and around premises such as commercial, residential, or governmental buildings. Examples of these buildings include offices, hospitals, warehouses, schools or universities, shopping malls, government offices, and casinos. The security systems typically control access to doors and windows for preventing unauthorized access to the premises and rooms within the premises. The security systems typically include components such as system controllers, access control readers, motion detectors, video surveillance cameras, network video recorders (NVRs), and door controllers, to list a few examples.

Access to traditional security systems is typically achieved using a keypad. The user is typically granted access to the security system when the user enters the authorized access code (password/PIN) via the physical keys of the keypad. Typically, the keypad is the last device that is accessed before a security system is armed and the first device that is accessed when the security system is disarmed. In both cases, a delay is typically applied between the moment of a sensor detecting an intrusion and the alarm being triggered by the system. Once the user has access to the system, the user can arm and/or disarm the system and its components, change its configuration, and gain access to rooms and facilities within the premises, in examples.

Modern methods for entering access codes include use of virtual keys instead of physical keys. In one example, virtual keys can be presented within a touchscreen (e.g. resistive or capacitive) such as a Liquid Crystal Display (LCD) touchscreen. In another example, a virtual projection keyboard including virtual keys can be projected onto a flat surface such as a table or wall.

SUMMARY OF THE INVENTION

The present invention improves upon current security systems and methods by providing a dual or progressive access level security system and method. The present invention provides an additional level/step in the validation process of a user beyond the single access code validation step common to current systems and methods. In examples, the additional level can be obtained either by receiving or obtaining an initial access identifier such as from a biometric reader that scans the user or from a wireless computing device or wireless tag carried by the user. The initial access identifier is validated before the system enables the entry of the access code. For example, the system can activate a keyboard for the user to enter the access code in response to validating the initial access identifier.

In examples, the initial access identifier is obtained using some type of biometric identity reader that scans the user or is obtained from user devices. Examples of user devices include mobile computing devices, e.g., cellular phone, or keycards or RFIDs, which are carried by the users. The user devices transmit or otherwise provide the initial access identifiers.

Biometrics concerns the recognition of individuals based on their unique biological and behavioral characteristics. Biometric scanners provide the ability to read a person's biometric identifiers. Biometric identifiers include one's fingerprints, iris and/or retina of the eye, voice exemplars, written signature, gait, and facial features, in examples.

In one example, antenna identity readers located within the vicinity of the doors can acquire the initial access user identifiers such as user credentials included within tags and/or on user devices. User devices, such as key fobs, mobile phones, or other mobile computing devices, transmit the initial access user identifiers in wireless data packets, which are then received by the antennas. This can provide users with access to the security system without the users having to manually press keys on a keypad or swipe an access card. In examples, antenna identity readers include Near Field Communication (NFC) and Bluetooth Low Energy (BLE) antennas.

In general, according to one aspect, the invention features a method for granting access to a security system. Preferably, the security system validates an initial access identifier for a user. In response to validation of the initial access identifier, a control panel of the security system presents virtual keys for a user to enter an access code. Then, the security system grants access to the user in response to validation of the access code for the user.

In one embodiment, in response to the validation of the initial access identifier, the control panel presents a virtual projected keyboard, and includes the virtual keys within the virtual projected keyboard. In another embodiment, in response to the validation of the initial access identifier, the control panel presents the virtual keys within a touchscreen of the control panel.

In general, according to another aspect, the invention features a security system, including an identity reader and a control panel. The identity reader preferably validates an initial access identifier for a user, and the control panel presents virtual keys for a user to enter an access code in response to validation of the initial access identifier.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3A includes physical keys, an antenna identity reader, and presents a virtual projected keyboard such as via a laser or laser scanner; FIG. 3B includes physical keys, a fingerprint scanner identity reader, and presents a virtual projected keyboard; FIG. 3C includes physical keys, an iris scanner and an antenna identity reader, and presents a virtual projected keyboard; and FIG. 3D includes an antenna identity reader and presents virtual keys within a touchscreen.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
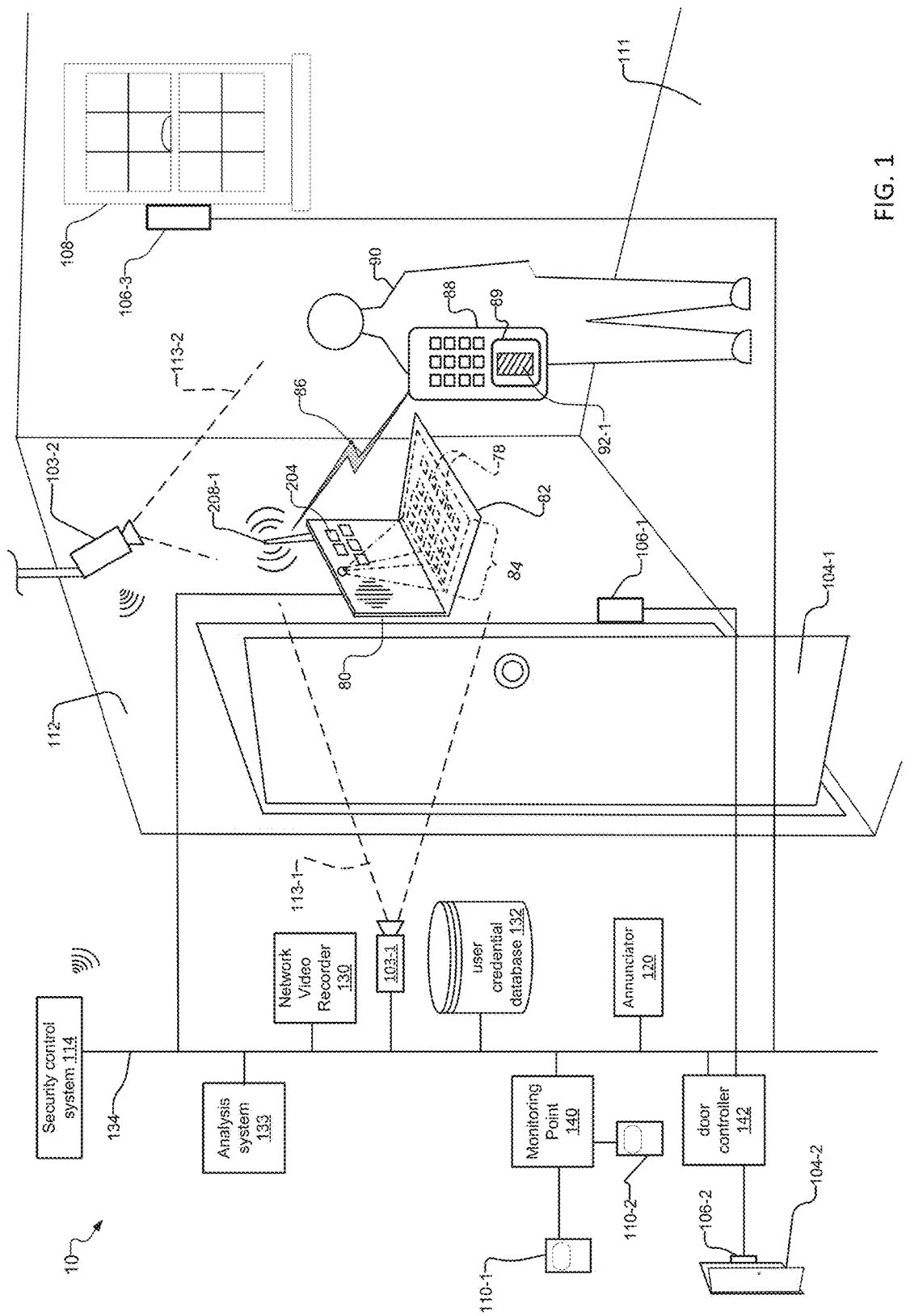
FIG. 1 is a system block and schematic diagram of a first embodiment of a dual access level security system, where an initial access identifier of the user is provided via wireless signals transmitted from a mobile phone/computing user device, and where in response to validation of the initial access identifier, the system presents a virtual projected keyboard for the user to enter an access code, the validation of which grants access to the security system.

FIG. 1 shows a first embodiment of dual level security system 10 within or for a premises. In examples, the premises can be a building, a residence, a hospital, or government building. The premises can also include a room 111 with a door 104-1 or part of building. A control panel 80 of the security system 10 controls access to the door 104-1 and other security devices in the system 10. The control panel 80 is mounted on a wall 112 within the room 111.

The security devices include the control panel 80, sensors and/or actuators 106 that are controlled by door controllers 142, motion detectors 110 that are controlled or monitored by a monitoring point 140, security cameras 103, an annunciator 120, a network video recorder 130, and a security control system 114. The security devices communicate over a security network 134 and are controlled by the security control system 114. Users 90 interact with the system via the control panel 80. A user credential database 132 stores credentials of users 90 and communicates over the security network 134. An analysis system 133 also communicates over the security network. In examples, the analysis system 133 receives information from the control panel 80 such as initial access identifiers 92 and access codes for users 90, and compares them to user credentials in the user credential database 132 to validate the initial access identifiers 92 and the access codes.

Security cameras 103-1 and 103-2 include fields of view 113-1 and 113-2, respectively. The fields of view 113 capture the control panel 80 and users 90 interacting with the control panel 80. In examples, security camera 103-1 is directly wired to the security network 134 and overhead security camera 103-2 communicates with the security network 134 via a wireless access point capability provided by the security control system 114. Window 108 includes sensor 106-3, door 104-1 includes sensor 106-1, and door 104-2 includes sensor 106-2. Monitoring point 140 monitors and controls motion detectors 110-1 and 110-2.

User 90 has a mobile phone or other mobile computing user device 88 located on their person. In other examples, the user device can be a laptop, fob, or tablet device. The user device 88 includes tag 89, or identification tag or other unique identifier such as a Bluetooth address, Radio Frequency Identifier (RFID) or RuBee ID (e.g. IEEE 1902.1), which in turn represents an initial access identifier 92-1 of the user. When the mobile phone 88 is located within vicinity of an antenna identity reader 208-1 of the control panel 80, the mobile phone 88 transmits the initial access identifier 92-1 in wireless signals 86 to the control panel 80 via the antenna identity reader 208-1.

The control panel 80 receives the initial access identifier 92-1 and sends it over the security network 134 for validation by the analysis system 133. In another implementation, the validation of the initial access identifier 92-1 can be performed locally within the control panel 80.

In response to the analysis system 133 validating the initial access identifier 92-1, the control panel 80 then presents virtual projected keyboard 84 including virtual keys 78. The control panel 80 presents the virtual projected keyboard 84 on a wall 112 or flat surface such as a desk or a pull-out console 82 of the control panel 80. Because the virtual projected keyboard 84 is only displayed in response to validation of the initial access identifier 92-1, the virtual keys 78 are also normally invisible to the user 90. This can provide enhanced access security over existing security systems and methods.

The user 90 then enters an access code via the virtual keys 78. In response to validation of the access code by the analysis system 133, the security system 10 grants access to the security system 10 and its security devices. In the example, user 90 is granted access to door 104-1, which the door controller 142 opens in response to the validation of the access code entered by the user.

It is also important to note that the identity readers 92 can also be included outside the control panel 80. In one example, overhead camera 103-2 can function as a biometric identity reader by providing a biometric identifier 92 based on the gait of the user 90 as he/she enters the room 111. In another example, the antenna identity reader 208-1 can be included within the wall 112 or elsewhere instead of within the control panel 80.

It can also be appreciated that the system 10 can be used to grant access to one's home or business premises. In this example, the control panel 80 is located adjacent to an exterior door 104 that provides access to a residence. In response to the system 10 validating both the initial access identifier and the access code, the system grants access to the residence by enabling a door relay or actuator 106 that opens the exterior door 104.

In another implementation, the system 10 can require the user 90 to provide or can itself acquire a set of initial access identifiers 92 in a progressive and/or ordered sequence. In response to validation of the set of initial access identifiers 92, the system 10 then presents the virtual keys 78 for users to enter the access code. For example, the set of initial access identifiers 92 can include an identifier 92-1 from an RFID tag 89 of a smart phone 88, followed by an identifier 92-2 from a fingerprint scanner 208-2. The system 10 then validates both initial access identifiers 92-1 and 92-2 before activating/presenting the virtual keys 78 for the user 90 to enter the access code. This can provide additional security protection.

Figure 2:
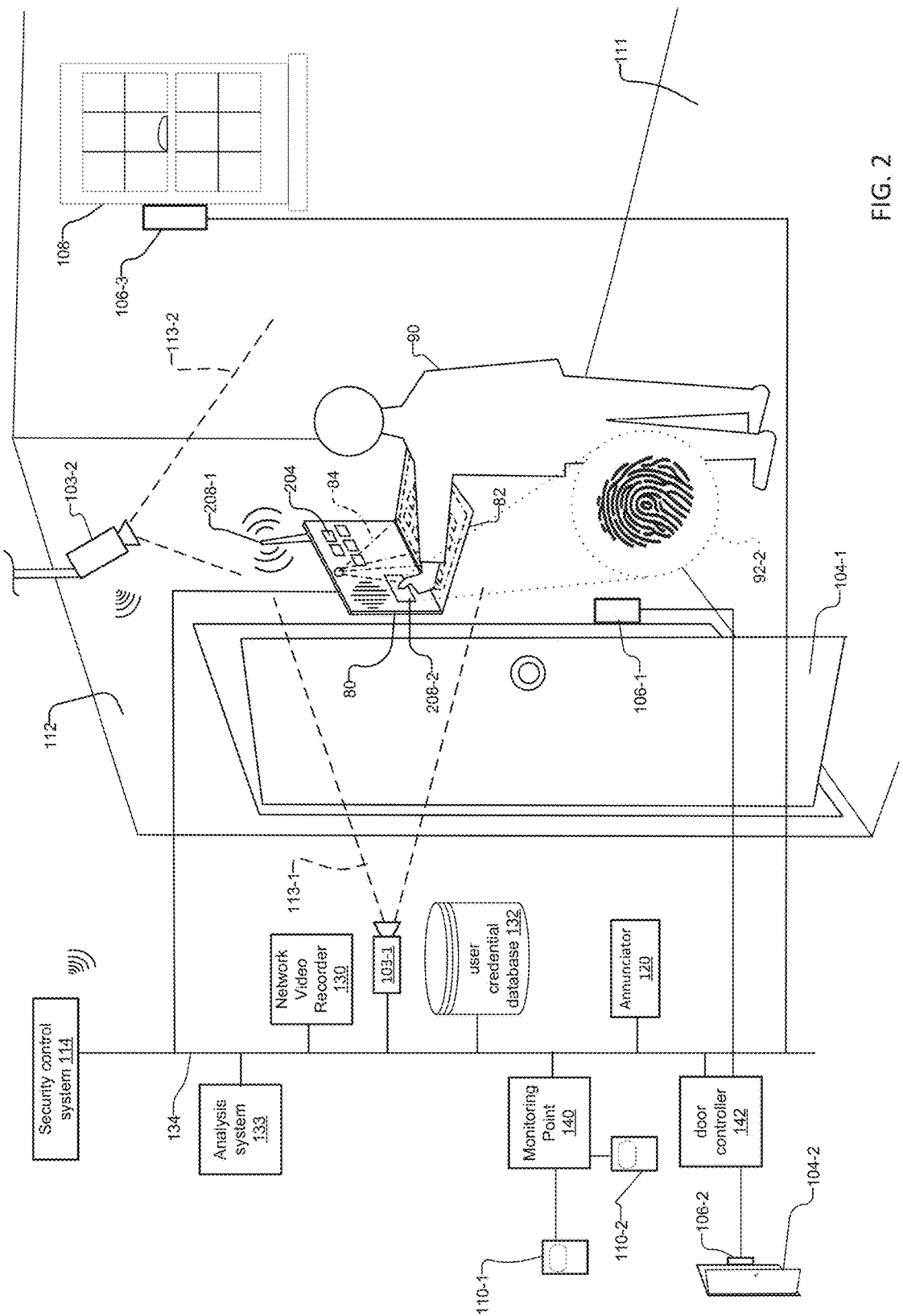
FIG. 2 is a system block and schematic diagram of a second embodiment of the dual access level security system, where the initial access identifier of the user is instead a fingerprint biometric identifier of the user.

FIG. 2 shows a second embodiment of dual level security system 10 for a premises. Instead of an antenna identity reader 208-1 receiving the initial access identifier 92 of the user, a biometric scanner identity reader such as a fingerprint scanner 208-2 receives a biometric identifier of the user, a fingerprint initial access identifier 92-2.

As in FIG. 1, in response to the analysis system 133 validating the initial access identifier 92-2, the control panel 80 then presents virtual projected keyboard 84 including virtual keys 78. The user 90 then enters an access code via the virtual keys 78. In response to validation of the access code by the analysis system 133, the security system 10 grants access to the security system 10 and its security devices.

Note that in addition to a person's fingerprint initial access identifier 92-2, biometric identifiers also include a person's iris print, hand, face, voice, gait, vascular/vein pattern recognition (VPR) or written signature, in examples. Biometric identifiers are associated with an individual's unique biological and/or behavioral characteristics.

Figure 3A:
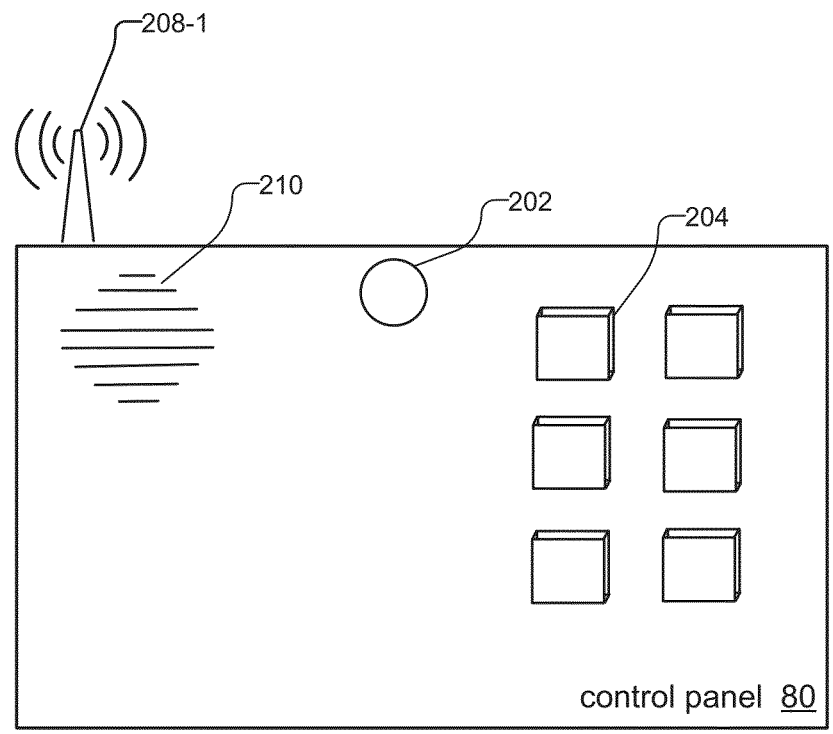
FIGS. 3A-3D show different exemplary control panels of the security system, where.

FIG. 3A shows a first example control panel 80. The control panel 80 includes physical keys 204, a laser 202 for presenting the virtual projected keyboard 82, a speaker 210, and an antenna identity reader 208-1. Upon validation of the initial access identifier 92 received by the antenna identity reader 208-1, in examples, users 90 can either enter the access code via the physical keys 204 of the control panel 80 or via the virtual keys 78 of the virtual projected keyboard 84 that the control panel 80 presents with the laser scanner system 202.

Figure 3B:
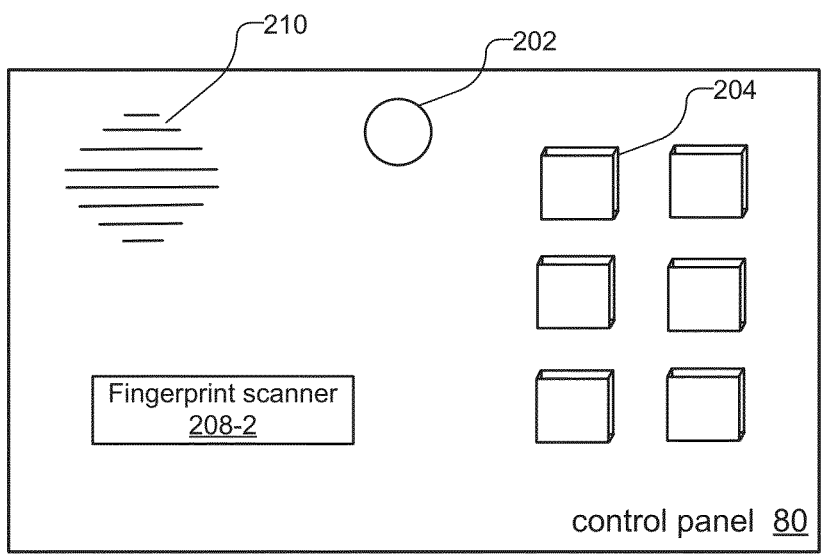

FIG. 3B shows a second example control panel 80. The control panel 80 includes physical keys 204, laser scanner 202 for presenting the virtual projected keyboard 82, a speaker 210, and a fingerprint scanner identity reader 208-2. Upon validation of the initial access identifier 92 received by the fingerprint scanner identity reader 208-2, in examples, users 90 can enter the access code via the physical keys 204 of the control panel 80 or the virtual keys 78 of the virtual projected keyboard 84 that the control panel 80 presents via the laser scanner 202.

Figure 3C:
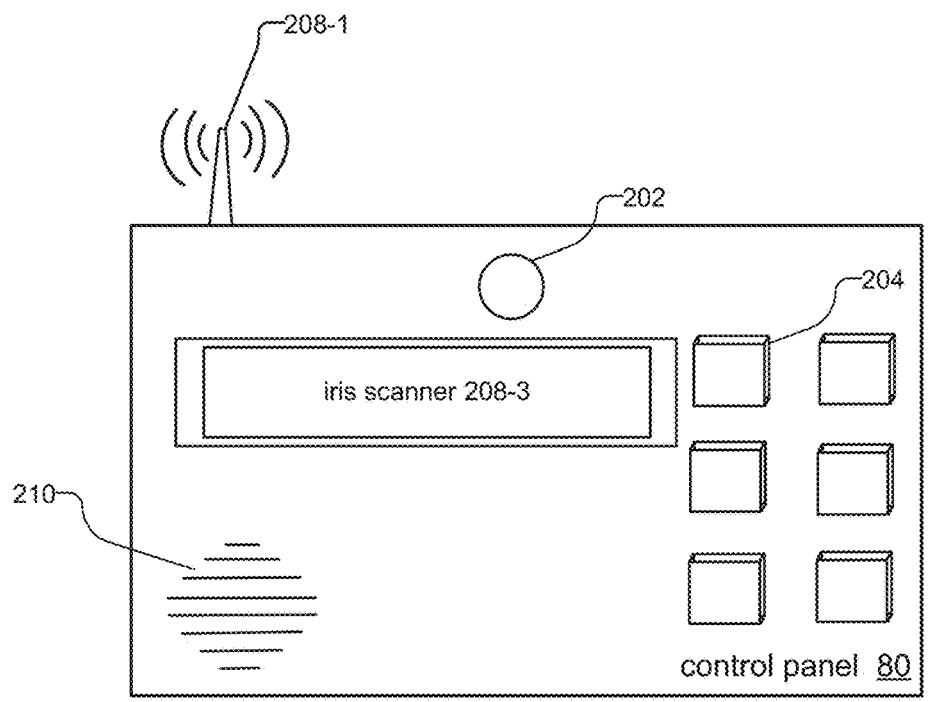

FIG. 3C shows a third example control panel 80. The control panel 80 includes physical keys 204, laser scanner 202 for presenting the virtual projected keyboard 82, a speaker 210, an iris scanner identity reader 208-3, and an antenna identity reader 208-1.

In this example, the initial access identifier 92 can be received by either the iris scanner identity reader 208-3 or the antenna identity reader 208-1. Upon validation of the initial access identifier 92, in examples, users 90 can enter the access code via the physical keys 204 of the control panel 80 or the virtual keys 78 of the virtual projected keyboard 84 that the control panel 80 presents via the laser scanner 202.

Figure 3D:
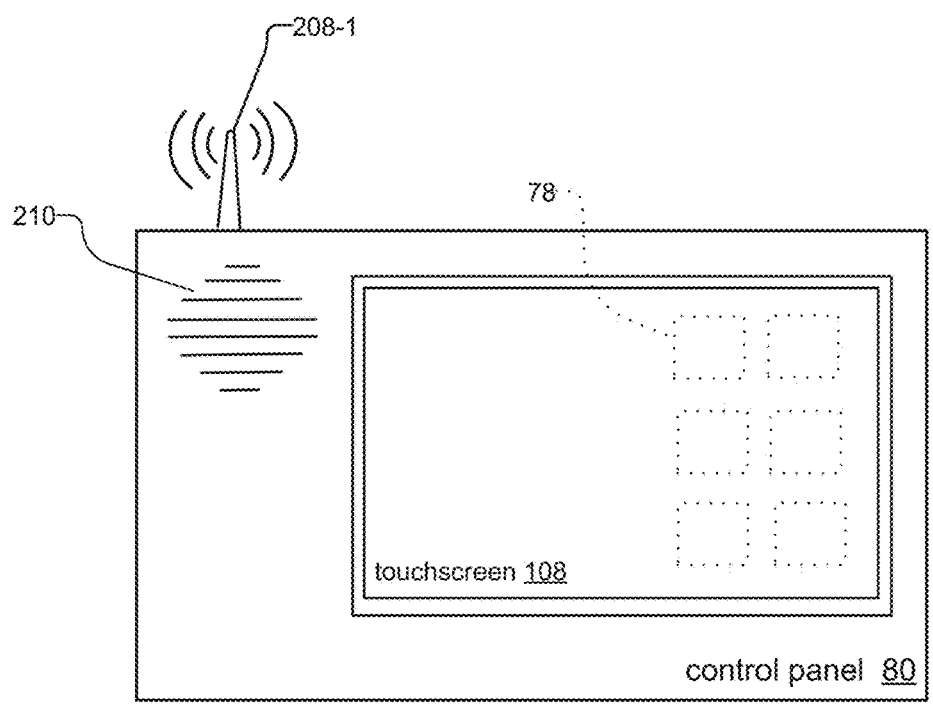

FIG. 3D shows a fourth example control panel 80. The control panel 80 includes a touchscreen 108 that includes virtual keys 78. The virtual keys 78 are normally invisible to the user 90.

In this example, the initial access identifier 92 is received by the antenna identity reader 208-1. Upon validation of the initial access identifier 92, the touchscreen 108 presents the virtual keys 78 to the user, making them visible. The user 90 then enters the access code via the virtual keys 78 of the touchscreen 108.

Figure 4:
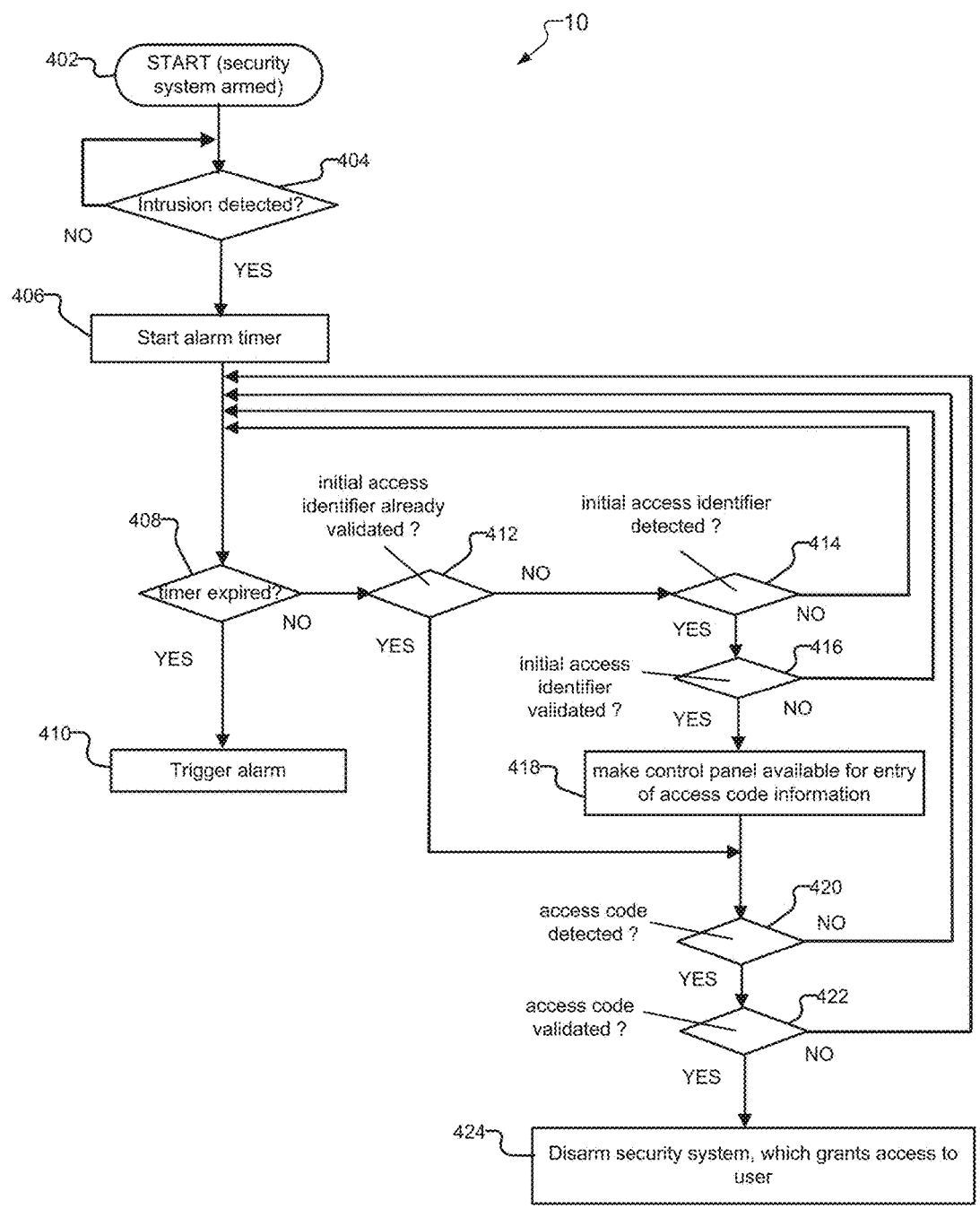
FIG. 4 shows the flowchart of a method for disarming or otherwise accessing the security system (thereby granting user access to the entire security system) or an area, room or building protected by the security system in response to authentication of both an initial access identifier of the user and an access code for the user.

FIG. 4 shows a method of operation for a dual access security system 10.

In step 402, the system 10 begins in an armed state and awaits detection of events from its security devices, such as an intrusion event. In step 404, if no intrusion is detected, method loops back to the beginning of step 404. Otherwise, the method transitions to step 406 and the alarm timer is started.

In step 408, the method checks to see if an alarm timer has expired. If the alarm timer has expired in step 410, the alarm is triggered. Otherwise the method transitions to step 412. In step 412, the method checks to see if an initial access identifier 92 has already been detected and validated by the system. Because the user is initially accessing the system, the method transitions to step 414.

It is important to note that the timer in step 406 is free-running and increases with all activities that are subsequent to step 406, including all control paths that re-enter step 408.

In step 414, the method checks whether an initial access identifier 92 has been detected. If no initial access identifier 92 has been detected, the method transitions back to step 408. Otherwise, the method transitions to step 416.

In step 416, the method checks whether an initial access identifier 92 has been validated. If no initial access identifier 92 has been validated, the method transitions to the beginning of step 408. Otherwise, the method transitions to step 418.

In step 418, because the initial access identifier 92 has been validated, the system 10 makes the control panel 80 available for entry of access code information. The method then transitions to step 420.

In step 420, the method checks whether an access code has been detected. If no access code 92 has been detected, the method transitions to the beginning of step 408. Because the initial access code has already been validated in step 416, control passes through the "YES" branch of step 412 to repeat access detection step 420. Otherwise, the method transitions to step 422.

In step 422, the method checks whether an access code has been validated. If no access code has been validated, the method transitions to the beginning of step 408. Because the initial access code has already been validated in step 416, control passes through the "YES" branch of step 412 to repeat the access validation step 422. Otherwise, the method transitions to step 424.

In step 424, in response to validation of the access code in step 422, the security system is disarmed, which grants access to the user.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for granting access to a security system, the method comprising:
   providing a control panel of the security system, the control panel being installed at a door of a premises;
   a user device of a user transmitting at least one initial access user identifier to the control panel in wireless signals when the user device is in proximity to an antenna identity reader of the control panel; wherein the at least one initial access user identifier contains user credentials of the user;
   the security system validating the at least one initial access user identifier for the user at the door of the premises by comparing the transmitted user credentials to credentials of users stored in a database to validate the user credentials;
   the control panel of the security system installed at the door presenting virtual keys for the user to enter an access code, wherein the virtual keys are presented in a virtual projected keyboard that includes the virtual keys and are invisible to the user prior to validation of the at least one initial access user identifier and are only displayed in response to the validation of the at least one initial access user identifier; and
   granting access to the user in response to validation of the access code for the user.

2. The method of claim 1, wherein the control panel of the security system presenting the virtual keys for the user to enter the access code comprises presenting the virtual keys within a touchscreen of the control panel.

3. The method of claim 1, wherein the user device includes a key fob and/or a mobile phone.

4. The method of claim 1, further comprising storing the at least one initial access user identifier in an identification tag on the user device.

5. The method of claim 1, wherein validating the at least one initial access user identifier further comprises:
   the control panel transmitting the user credentials of the user over a security network of the security system to an analysis system; and
   the analysis system comparing the transmitted user credentials to credentials of users stored in the database.

6. The method of claim 1, wherein the at least one initial access user identifier includes an identifier from a Radio Frequency Identifier (RFID) tag and a biometric identifier.

7. A security system, comprising:
   an antenna identity reader receiving at least one initial access user identifier transmitted wirelessly to a control panel from a user device of a user for validating the at least one initial access user identifier for the user at a door of a premises; wherein the at least one initial access user identifier contains user credentials of the user, and validation is done by comparing the transmitted user credentials to credentials of users stored in a database to validate the user credentials; and
   the control panel installed at the door for presenting virtual keys for the user to enter an access code, wherein the virtual keys are included within a virtual projected keyboard of the control panel and are invisible to the user prior to validation of the at least one initial access user identifier and are only displayed in response to the validation of the at least one initial access user identifier.

8. The system of claim 7, wherein the virtual keys are included within a touchscreen of the control panel.

9. The system of claim 7, wherein the user device includes a key fob and/or a mobile phone.

10. The system of claim 7, wherein the user device includes a tag that includes the at least one initial access user identifier.

11. The system of claim 7, wherein the antenna identity reader is a Bluetooth Low Energy (BLE) antenna.

12. The system of claim 7, wherein the antenna identity reader is a Near Field Communication (NFC) antenna.

13. The system of claim 7, wherein the antenna identity reader is a Radio Frequency Identifier (RFID) antenna.

14. The system of claim 7, wherein the security system grants access to the user in response to validation of the access code for the user.

15. The system of claim 7, wherein the at least one initial access user identifier includes an identifier from a Radio Frequency Identifier (RFID) tag and a biometric identifier.

16. A method for granting access to a security system, the method comprising:
   scanning a biometric identifier of a user as an initial access user identifier for the user at a door of a premises;
   the security system validating the initial access user identifier for the user by comparing the biometric identifier to credentials of users stored in a database;
   a control panel of the security system installed at the door presenting virtual keys for the user to enter an access code at the door, wherein the virtual keys are presented in a virtual projected keyboard that includes the virtual keys and are invisible to the user prior to validation of the initial access user identifier and are only displayed in response to the validation of the initial access user identifier; and
   granting access to the user in response to validation of the access code for the user.

17. A security system, comprising:
   an identity reader for validating an initial access user identifier containing user credentials for a user at a door of a premises, wherein the identity reader is a biometric scanner for obtaining the initial access user identifier for the user for comparison with credentials of users stored in a database to validate the credentials; and
   a control panel installed at the door for presenting virtual keys for a user to enter an access code, wherein the virtual keys are presented in a virtual projected keyboard that includes the virtual keys and are invisible to the user prior to validation of the initial access identifier and are only displayed in response to the validation of the initial access identifier.

18. The system of claim 17, wherein the biometric scanner is a facial recognition scanner.

19. The system of claim 17, wherein the biometric scanner is a fingerprint scanner and/or an iris scanner.

* * * * *